United States Patent
Park et al.

(10) Patent No.: US 11,725,069 B2
(45) Date of Patent: Aug. 15, 2023

(54) METHOD FOR PRODUCING POLYPROPYLENE

(71) Applicants: SK Innovation Co., Ltd., Seoul (KR); SK Geo Centric Co., Ltd., Seoul (KR)

(72) Inventors: Hyo Seung Park, Daejeon (KR); Hyeong Min Kim, Daejeon (KR); Sung Jae Na, Daejeon (KR); Ji Hae Park, Daejeon (KR); So Young Shim, Daejeon (KR)

(73) Assignees: SK Innovation Co., Ltd., Seoul (KR); SK Geo Centric Co., Ltd., Seoul (KR)

(*) Notice: Subject to any disclaimer, the term of this patent is extended or adjusted under 35 U.S.C. 154(b) by 8 days.

(21) Appl. No.: 17/500,012

(22) Filed: Oct. 13, 2021

(65) Prior Publication Data
US 2022/0119560 A1 Apr. 21, 2022

(30) Foreign Application Priority Data
Oct. 15, 2020 (KR) .................. 10-2020-0133188

(51) Int. Cl.
*C08F 110/06* (2006.01)
*C08F 4/642* (2006.01)
*C08F 4/659* (2006.01)

(52) U.S. Cl.
CPC ................. *C08F 110/06* (2013.01)

(58) Field of Classification Search
CPC ... C08F 110/06; C08F 4/6425; C08F 4/65912
See application file for complete search history.

(56) References Cited

U.S. PATENT DOCUMENTS

| | | | |
|---|---|---|---|
| 4,500,648 A | 2/1985 | Malpass | |
| 5,849,653 A | 12/1998 | Dall'Occo et al. | |
| 6,054,406 A | 4/2000 | Smith | |
| 2010/0036067 A1* | 2/2010 | Lee | C08F 10/00 502/158 |
| 2016/0215077 A1* | 7/2016 | Singh | C08F 110/06 |

FOREIGN PATENT DOCUMENTS

| | | |
|---|---|---|
| KR | 100204444 B1 | 6/1999 |
| KR | 26000029770 A | 5/2000 |
| KR | 100356549 B1 | 2/2003 |

OTHER PUBLICATIONS

Ishihara et al., "Additive Effects of Dialkylaluminum Hydrides on Propylene-1,3-Butadiene Copolymerization Using an Isospecific Zirconocene Catalyst", Progress in Olefin Polymerization Catalysts and Polyolefin Materials, 2006, pp. 197-200.

Weliange et al., "Insertion, elimination and isomerisation of olefins at alkylaluminium hydride: an experimental and theoretical study", The Royal Society of Chemistry, Dalton Transactions, 2015, vol. 44, pp. 15286-15296.

* cited by examiner

*Primary Examiner* — Catherine S Branch
(74) *Attorney, Agent, or Firm* — The Webb Law Firm

(57) ABSTRACT

Provided is a method of producing polypropylene. More specifically, provided is a method of efficiently producing high-strength isotactic polypropylene having high crystallinity even with a shorter polymerization time. More specifically, provided is a method of producing polypropylene, including polymerizing propylene in the presence of a catalyst composition including a Ziegler-Natta catalyst, an external electron donor, dialkylaluminum hydride, and trialkylaluminum. The polypropylene has a xylene cold soluble content of 3 wt % or less.

13 Claims, No Drawings

METHOD FOR PRODUCING POLYPROPYLENE

CROSS-REFERENCE TO RELATED APPLICATION

This application claims priority to Korean Patent Application No. 10-2020-0133188 filed Oct. 15, 2020, the disclosure of which is hereby incorporated by reference in its entirety.

BACKGROUND OF THE INVENTION

Field of the Invention

The following disclosure relates to a method of producing polypropylene. More particularly, the following disclosure relates to a method of efficiently producing high-strength isotactic polypropylene having high crystallinity even with a shorter polymerization time.

Description of Related Art

Polypropylene has been conventionally used as a general-purpose resin in various fields due to its low specific gravity, high thermal resistance, excellent processability, and chemical resistance.

Many efforts have been made to improve mechanical strength without impairing various intrinsic properties of the propylene polymer. The properties are known to be improved by adjusting the crystallinity, molecular weight, and the like of the propylene polymer.

Therefore, research for the composition of a catalyst which allows production of polypropylene having excellent physical properties of excellent mechanical strength and high crystallinity in a shorter time as compared with a conventional method of producing homopolypropylene using a general-purpose Ziegler-Natta catalyst was needed.

SUMMARY OF THE INVENTION

An embodiment of the present invention is directed to providing a composition of a catalyst which allows obtainment of a yield above a certain level in a shorter time as compared with a conventional method of producing homopolypropylene using a general-purpose Ziegler-Natta catalyst and production of homopolypropylene having excellent physical properties of mechanical physical properties and high crystallinity, and a method of producing polypropylene which allows manufacture of a high-strength product using the same.

As a result of studying for achieving the object, the inventors of the present invention found that a catalyst composition of a specific combination is used to produce homopolypropylene having equivalent or better physical properties in a shorter time as compared with the case of using a conventional Ziegler-Natta catalyst, thereby completing the present invention.

In one general aspect, a method of producing polypropylene includes polymerizing propylene in the presence of a catalyst composition including a Ziegler-Natta catalyst, an external electron donor, dialkylaluminum hydride, and trialkylaluminum, wherein the polypropylene has a xylene cold soluble content of 3 wt % or less as measured by a CRYSTEX instrument (CRYSTEX 42 model, manufactured by Polymer Characterization, S.A.).

As an exemplary embodiment, the catalyst composition may include 0.005 to 0.1 wt % of the Ziegler-Natta catalyst, 5 to 20 wt % of the external electron donor, 0.05 to 3 wt % of the dialkylaluminum hydride, and 10 to 94 wt % of the trialkylaluminum, but is not limited thereto.

As an exemplary embodiment, the catalyst composition may have a titanium molar ratio of trialkylaluminum/Ziegler-Natta catalyst of 500 to 5000.

As an exemplary embodiment, the Ziegler-Natta catalyst may include 10 to 30 wt % of magnesium (Mg) and 0.5 to 5 wt % of titanium (Ti).

As an exemplary embodiment, the titanium molar ratio of dialkylaluminum hydride/Ziegler-Natta catalyst may be 1 to 30.

As an exemplary embodiment, the dialkylaluminum hydride may include diisobutylaluminum hydride (DIBAL-H).

As an exemplary embodiment, the external electron donor may be any one or a mixture of two or more selected from diphenyldimethoxysilane, phenyltrimethoxysilane, phenylethyldimethoxysilane, phenylmethyldimethoxysilane, N,N-diethylaminotriethoxysilane, bis(ethylamino)dicyclopentylsilane, trimethoxypropylsilane, methoxytrimethylsilane, isobutyltrimethoxysilane, diisobutyldimethoxysilane, diisopropyldimethoxysilane, di-t-butyldimethoxysilane, dicyclopentyldimethoxysilane, cyclohexylmethyldimethoxysilane, dicyclohexyldimethoxysilane, and the like.

As an exemplary embodiment, the production method may include:

a) adding the dialkylaluminum hydride and the trialkylaluminum and then adding the Ziegler-Natta catalyst and the external electron donor to a reactor to prepare the catalyst composition; and b) adding propylene and hydrogen to the catalyst composition and performing polymerization.

As an exemplary embodiment, in step b), the polymerization may be performed at 50 to 80° C. for 10 minutes to 120 minutes.

As an exemplary embodiment, in step b), the polymerization may be performed under a pressure of 20 to 50 bar.

As an exemplary embodiment, the polypropylene may be a propylene homopolymer.

As an exemplary embodiment, the polypropylene may have a melt index of 30 to 60 g/10 min as measured at 230° C. under a load of 2.16 kg in accordance with ASTM D1238 and a weight average molecular weight of 330,000 to 500,000 g/mol.

As an exemplary embodiment, the polypropylene may have, when an endothermic peak is measured using successive self-nucleation and annealing (SSA)-differential scanning calorimeter (DSC), a sum of a peak value (DH4) observed at 170° C. and a peak value (DH5) observed at 176° C. of 75% or more of a total peak.

As an exemplary embodiment, the peak value (DH5) observed at 176° C. may be 25% or more of the total peak.

As an exemplary embodiment, a content of the Ziegler-Natta catalyst may be 0.0001 to 0.002 parts by weight with respect to 100 parts by weight of the propylene.

As an exemplary embodiment, a content of the dialkylaluminum hydride may be 0.00001 to 0.1 parts by weight with respect to 100 parts by weight of propylene.

Other features and aspects will be apparent from the following detailed description, the drawings, and the claims.

DESCRIPTION OF THE INVENTION

Hereinafter, the present invention will be described in more detail. However, the following specific or exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

Hereinafter, each constituent element of the present invention will be described in more detail.

The present invention uses a catalyst composition for polypropylene polymerization including a Ziegler-Natta catalyst, an external electron donor, diisobutylaluminum hydride (DIBAL-H), and trialkylaluminum. By using the catalyst composition, a homopolypropylene polymer having equivalent or better physical properties may be provided in a shorter time as compared with the case of using only the Ziegler-Natta catalyst and the external electron donor conventionally.

More specifically, in an exemplary embodiment of the production method of the present invention, in producing the catalyst composition, it is characterized by the order and the rate of addition of the catalyst, and in a range of satisfying both the conditions, polypropylene having a xylene cold soluble content of 3 wt % or less as measured by a CRYSTEX instrument (CRYSTEX 42 model, manufactured by Polymer Characterization, S.A.) may be produced.

In an exemplary embodiment of the present invention, the catalyst composition may include 0.005 to 0.1 wt % of the Ziegler-Natta catalyst, 5 to 20 wt % of the external electron donor, 0.05 to 3 wt % of the dialkylaluminum hydride, and 10 to 94 wt % of the trialkylaluminum, but is not limited thereto. As an exemplary embodiment, the catalyst composition may have a titanium molar ratio of dialkylaluminum hydride/Ziegler-Natta catalyst of 1 to 30 and a titanium molar ratio of trialkylaluminum/Ziegler-Natta catalyst of 500 to 5000. As an exemplary embodiment, the Ziegler-Natta catalyst may include 10 to 30 wt % of magnesium (Mg) and 0.5 to 5 wt % of titanium (Ti).

In the content range, a propylene polymer having high crystallinity may be produced even in a shorter time. More specifically, the polymer may express physical properties which are equivalent to or better than a polypropylene polymer conventionally produced by polymerization for 60 minutes or more, even with polymerization for 60 minutes or less, more specifically 10 minutes to 60 minutes.

The Ziegler-Natta catalyst includes a transition metal compound including an element belonging to Group 4, 5, or 6 and an organometallic compound including an element belonging to Group 13 in the periodic table.

As an exemplary embodiment, a mole ratio of the organometallic compound to the transition metal compound may be 5 to 50.

As the transition metal compound, a solid titanium catalyst containing magnesium, titanium, a halogen element, and an internal electron donor may be used. The Ziegler-Natta-based catalyst used in the pre-polymerization process is dispersed into uniform particles in the pre-polymerization process and then a high molecular weight monomer is polymerized on the surface of the catalyst. As the Ziegler-Natta-based catalyst as such, any catalyst may be used without particular limitation as long as it is used for general olefin polymerization, but preferably, a catalyst including a transition metal compound including an element belonging to Group 4, 5, or 6 of the periodic table; and an organometallic compound including an element belonging to Group 13 of the periodic table may be used.

Since the transition metal compound is used as a main catalyst in the Ziegler-Natta-based catalyst, preferably, it is possible to use a solid titanium catalyst including magnesium, titanium, a halogen atom, and an internal electron donor. Here, as the internal electron donor, for example, a diether compound, a phthalate-based compound, or a mixture thereof may be used, and specifically, diisobutyl phthalate and the like may be used.

More preferably, the transition metal compound includes magnesium and titanium, and 10 to 30 wt % of magnesium (Mg) and 0.5 to 5 wt % of titanium (Ti) may be included.

In an exemplary embodiment of the present invention, as the organometallic compound, any organoaluminum compound commonly used in the art may be used without limitation.

In an exemplary embodiment of the present invention, a content of the Ziegler-Natta catalyst may be 0.0001 to 0.01 parts by weight with respect to 100 parts by weight of the propylene, but is not limited thereto.

In an exemplary embodiment of the present invention, as the external electron donor, an organosilane compound may be used, and specifically, for example, it may be any one or a mixture of two or more selected from diphenyldimethoxysilane, phenyltrimethoxysilane, phenylethyldimethoxysilane, phenylmethyldimethoxysilane, N,N-diethylaminotriethoxysilane, bis(ethylamino)dicyclopentylsilane, trimethoxypropylsilane, methoxytrimethylsilane, isobutyltrimethoxysilane, diisobutyldimethoxysilane, diisopropyldimethoxysilane, di-t-butyldimethoxysilane, dicyclopentyldimethoxysilane, cyclohexylmethyldimethoxysilane, dicyclohexyldimethoxysilane, and the like, but is not limited thereto. More preferably, any one or more selected from cyclohexylmethyldimethoxysilane and dicyclohexyldimethoxysilane may be used.

The trialkylaluminum may be any one or a mixture of two or more selected from trimethylaluminum, tri(i-propyl) aluminum, tri(n-butyl) aluminum, tri(i-butyl) aluminum, tri(t-butyl) aluminum, tri(n-hexyl) aluminum, tri(n-octyl) aluminum, and the like, but is not limited thereto. More preferably, any one or more selected from triethylaluminum and trimethylaluminum may be used.

The dialkylaluminum hydride may have C3 to C10 alkyl, and more preferably, may include diisobutylaluminum hydride (DIBAL-H).

A content of the dialkylaluminum hydride may be 0.0001 to 0.01 parts by weight with respect to 100 parts by weight of propylene, but is not limited thereto.

It is preferred that the addition order of the catalyst composition is adding diisobutylaluminum hydride (DIBAL-H) and trialkylaluminum and then adding a Ziegler-Natta catalyst and an external electron donor to the reactor to prepare a catalyst composition. Here, the temperature of the reactor is preferably 10° C. or lower, more specifically, for example, 1 to 10° C., and more preferably 3 to 7° C.

More specifically, diisobutylaluminum hydride (DIBAL-H) and trialkylaluminum is added in a state of being dissolved in an organic solvent such as toluene, the external electron donor is added, and then the Ziegler-Natta catalyst dissolved in an organic solvent such as methyl cyclohexane is added.

In an exemplary embodiment of the present invention, propylene is preferably added after preparing the catalyst composition, and hydrogen is added when propylene may be added to control a molecular weight.

As an exemplary embodiment, it is preferred to perform polymerization by raising the reaction temperature of the reactor after adding the propylene and hydrogen, and the polymerization may be performed at 50 to 80° C. for 10 minutes to 60 minutes. In addition, the polymerization may be performed under a pressure of 20 to 50 bar.

More specifically, the method of producing polypropylene according to an exemplary embodiment of the present invention includes:

a) adding the dialkylaluminum hydride and the trialkylaluminum and then adding the Ziegler-Natta catalyst and the external electron donor to a reactor to prepare the catalyst composition; and b) adding propylene and hydrogen to the catalyst composition and performing polymerization.

A polypropylene polymer produced by the method according to an exemplary embodiment of the present invention may have a xylene cold soluble content of 3 wt % or less, more preferably 0.5 to 3 wt % as measured by a CRYSTEX instrument (CRYSTEX 42 model, manufactured by Polymer Characterization, S.A.). More specifically, the xylene cold soluble content may be 2 to 2.8 wt %. A lower xylene cold soluble content means higher crystallinity, and in the present invention, a catalyst composition of four, that is, dialkylaluminum hydride, trialkylaluminum, the Ziegler-Natta catalyst, and the external electron donor are mixed and used, thereby satisfying the range.

In addition, the polypropylene polymer according to an exemplary embodiment of the present invention may have, though is not limited thereto, specifically, for example, a melt index of 30 to 60 g/10 min as measured at 230° C. under a load of 2.16 kg in accordance with ASTM D1238 and a weight average molecular weight of 330,000 to 500,000 g/mol.

In addition, since the polypropylene polymer according to an exemplary embodiment of the present invention uses a catalyst composition of four, it was confirmed that the tensile strength of the polymer was increased but impact strength and elongation at room temperature/low temperature were not deteriorated as compared with the case of producing the polymer by excluding one component among them. It is seen therefrom that the xylene cold soluble content causing deterioration of mechanical physical properties is decreased and a high crystallinity area to improve mechanical physical properties is increased to improve tensile strength. In addition, a crystal distribution and a tie molecule uniformity between crystals are good, so that equivalent or better values of impact strength and elongation at room temperature/low temperature are shown.

Specifically, for example, the polymer may satisfy both physical properties of a tensile strength of 200 kgf/cm$^2$ or more and an elongation of 10% or more. More specifically, the polymer may satisfy both physical properties of a tensile strength of 200 to 500 kgf/cm$^2$ and an elongation of 10% to 30%.

In addition, the polypropylene may have, when an endothermic peak is measured using successive self-nucleation and annealing (SSA)-differential scanning calorimeter (DSC), a sum of a peak value (DH4) observed at 170° C. and a peak value (DH5) observed at 176° C. of 90% or more of the total peak, in observation of a total of five peaks every 6° C. in a region of 152 to 176° C. That is, when only the Ziegler-Natta catalyst and the external electron donor are used, the sum of the peak value (DH4) observed at 170° C. and the peak value (DH5) observed at 176° C. is about 72% of the total peak, but the polypropylene produced using the catalyst composition of four of the present invention is confirmed to have more increased crystallinity of 75% or more, more preferably 75 to 80%. In addition, the peak value (DH5) observed at 176° C. may be 25% or more, more preferably 25 to 45% of the total peak.

In addition, when only the Ziegler-Natta catalyst and the External electron donor were used, the polymerization reaction was performed for 50 minutes, but the polypropylene produced using the catalyst composition of four of the present invention may satisfy the physical properties though the polymerization reaction was performed for 10 to 15 minutes.

Hereinafter, the present invention will be described in more detail with reference to the Examples and Comparative Examples. However, the following examples and comparative examples are only an example for describing the present invention in more detail, and do not limit the present invention in any way.

1) Xylene Cold Soluble Content (XCS %)

The xylene cold soluble content was measured with CRYSTEX (CRYSTEX 42 model, manufactured by Polymer Characterization, S.A.).

To 160 mg of each sample of polypropylene resins produced according to the examples and the comparative examples, trichlorobenzene was added, and heating was performed at 160° C. for 1 hour for pretreatment. A solvent was flowed at a speed of 3 mL/min and analysis was performed. The soluble fraction was analyzed at 35° C. for 40 minutes, heating was performed to 165° C., and the crystalline fraction was analyzed for 25 minutes.

2) Melt Index (MI)

The melt index was analyzed using a melt indexer (MI-4 model available from Goettfert).

Measurement was performed at 230° C. under a load of 2.16 kg in accordance with ASTM D1238, and the melt index was represented as a weight (g) of a polymer melted for 10 minutes.

3) Flexural Modulus

The flexural modulus was measured in accordance with ASTM D 790. A polymer was granulated at 180° C. to 230° C. using a 30 mm single screw extruder available from Brabender to prepare a pellet, and a 25 ton injection machine available from Boy was used to manufacture an ASTM specimen under the temperature conditions of 180° C. to 230° C. The manufactured specimen was used in the experiment after being allowed to stand for 48 hours at 23° C. under the conditions of a relative humidity of 50%. As a flexural modulus value, a Secant modulus value of 0.01 mm/mm was used.

4) Successive Self-Nucleation and Annealing (SSA)-Differential Scanning Calorimeter (DSC) Measurement DSC (Q20 Model available from TA Instruments) was used to perform the measurement. As sample, 10 to 15 mg of the polypropylene resins produced in the examples and the comparative examples were used.

The sample was heated to 200° C. at a rate of 10° C./min to be completely dissolved, cooled to 50° C. at a rate of 20° C./min, and maintained for 5 minutes. The sample was heated to 164° C. at a rate of 20° C./min. After being maintained for 10 minutes, the sample was cooled to 50° C. at a rate of 20° C./min and maintained for 5 minutes. The sample was heated to 159° C. at a rate of 20° C./min. After being maintained for 10 minutes, the sample was cooled to 50° C. at a rate of 20° C./min and maintained for 5 minutes. The sample was heated to 154° C. at a rate of 20° C./min. After being maintained for 10 minutes, the sample was cooled to 50° C. at a rate of 20° C./min and maintained for 5 minutes. The sample was heated to 149° C. at a rate of 20° C./min. After being maintained for 10 minutes, the sample was cooled to 50° C. at a rate of 20° C./min and maintained for 5 minutes. The sample was heated to 144° C. at a rate of 20° C./min. After being maintained for 10 minutes, the sample was cooled to 50° C. at a rate of 10° C./min and maintained for 5 minutes. The sample was heated to 200° C. at a rate of 20° C./min.

A total of five peaks were observed every 6° C. in a region of 152 to 176° C. That is, a peak value at 152° C. was indicated as DH1, a peak value at 158° C. was indicated as DH2, a peak value at 164° C. was indicated as DH3, a peak value at 170° C. was indicated as DH4, and a peak value at 176° C. was indicated as DH5.

5) Weight Average Molecular Weight (Mw)

The weight average molecular weight was measured by using GPC (PL-GPC 220 available from Agilent), PLgel Olexis Guard (7.5×50 mm) connected to PLgel Olexis (7.5×300 mm) as a GPC column, 1,2,4-trichlorobenzene as a solvent, and polystyrene (Mw 6,870,000) as a standard, and the analysis was performed at 160° C.

6) Tensile Strength and Elongation

The tensile strength and the elongation were measured in accordance with ASTM D 638. A polymer was granulated at 180° C. to 230° C. using a 30 mm single screw extruder available from Brabender to prepare a pellet, and a 25 ton injection machine available from Boy was used to manufacture an ASTM specimen under the temperature conditions of 180° C. to 230° C. The manufactured specimen was used in the experiment after being allowed to stand for 48 hours or more at 23° C. under the conditions of a relative humidity of 50%. As the tensile strength, a strength value at a yield point and a break point was used, and as the elongation, a total strain value increased in the break was used.

7) IZOD Impact Strength

IZOD impact strength was measured at room temperature (23° C.) and at a low temperature (−20° C.) in accordance with ASTM D256. A polymer was granulated at 180° C. to 230° C. using a 30 mm single screw extruder available from Brabender to prepare a pellet, and a 25 ton injection machine available from Boy was used to manufacture an ASTM specimen under the temperature conditions of 180° C. to 230° C. The manufactured specimen was used in the experiment after being allowed to stand for 48 hours or more at 23° C. under the conditions of a relative humidity of 50%.

Example 1 Production of Polypropylene Homopolymer

To a 3 L high pressure reactor, 0.030 mmol of a toluene solution in which 1M diisobutylaluminum hydride (DIBAL-H, Sigma Aldrich) was dissolved, 6.6 mmol of triethylaluminum (Sigma Aldrich), and 0.66 mmol of cyclohexylmethyldimethoxysilane as an external electron donor were added. 14 mg of a Ziegler-Natta catalyst (Mg supported Ti Ziegler-Natta catalyst, 20 wt % of Mg, 3 wt % of Ti) was mixed with 10 ml of methylcyclohexane and the mixture was added to the reactor.

1000 g of liquid propylene was added and hydrogen at 4000 sccm was added for 3 minutes. A polymerization reaction was performed at an internal temperature of 62° C. for 50 minutes. After the reaction was completed, the pressure was released, and purging was performed 5 times with nitrogen to remove residual propylene. The physical properties of the produced polypropylene homopolymer were measured and are shown in Tables 2 to 4.

Example 2

A polymer was produced in the same manner as in Example 1, except that the content of diisobutylaluminum hydride (DIBAL-H) was changed as shown in Table 2. The physical properties of the produced polypropylene homopolymer were measured and are shown in Tables 2 to 4.

Example 3

A polymer was produced in the same manner as in Example 1, except that the content of diisobutylaluminum hydride (DIBAL-H) was changed as shown in Table 2 and the polymerization time was adjusted to 15 minutes. The physical properties of the produced polypropylene homopolymer were measured and are shown in Tables 2 to 4.

Example 4

A polymer was produced in the same manner as in Example 1, except that diisobutylaluminum hydride (DIBAL-H) was changed to dioctylaluminum hydride (synthesized by the method in: DOAL-H, Dalton Trans., 2015, 44, 15286-15296, Nandita et al.), as shown in Table 2. The physical properties of the produced polypropylene homopolymer were measured and are shown in Tables 2 to 4.

Comparative Example 1

A polymer was produced in the same manner as in Example 1, except that diisobutylaluminum hydride (DIBAL-H) and triethylaluminum were not used. The physical properties of the produced polypropylene homopolymer were measured and are shown in Tables 2 to 4.

To a 3 L high pressure reactor, 0.66 mmol of cyclohexylmethyldimethoxysilane as an external electron donor was added. 14 mg of a Ziegler-Natta catalyst (Mg supported Ti Ziegler-Natta catalyst, 20 wt % of Mg, 2 wt % of Ti) was mixed with 10 ml of methylcyclohexane and the mixture was added to the reactor.

1000 g of liquid propylene was added and hydrogen at 4000 sccm was added for 3 minutes. A polymerization reaction was performed at an internal temperature of 62° C. for 50 minutes. After the reaction was completed, the pressure was released, and purging was performed 5 times with nitrogen to remove residual propylene. The physical properties of the produced polypropylene homopolymer were measured and are shown in Tables 2 to 4.

Comparative Example 2

A polymer was produced in the same manner as in Comparative Example 1, except that the polymerization time was adjusted to 15 minutes. The physical properties of the produced polypropylene homopolymer were measured and are shown in Table 2.

The following Table 1 shows the molar ratios of the catalyst.

TABLE 1

|  | Dialkylaluminum hydride (μmol) | Ti content in Ziegler-Natta catalyst (μmol) | Triethylaluminum (μmol) | Dialkylaluminum hydride/Ti (molar ratio) | Triethylaluminum/ Ti (molar ratio) |
|---|---|---|---|---|---|
| Example 1 | 10 | 5.85 | 6600 | 1.71 | 1128.21 |
| Example 2 | 30 | 5.85 | 6600 | 5.13 | 1128.21 |
| Example 3 | 30 | 5.85 | 6600 | 5.13 | 1128.21 |
| Example 4 | 10 | 5.85 | 6600 | 1.71 | 1128.21 |
| Comparative Example 1 | — | 5.85 | 6600 | — | 1128.21 |

TABLE 2

|  | Dialkylaluminum hydride type/content (μmol) | Polymerization time (min) | Yield (g) | Activity (g-PP/g-cat hr) | XCS % | MI (g/10 min) | Mw (g/mol) | MWD |
|---|---|---|---|---|---|---|---|---|
| Example 1 | DIBAL-H/10 | 50 | 516.2 | 44246 | 2.24 | 31 | 401446 | 5.4 |
| Example 2 | DIBAL-H/30 | 50 | 406.1 | 34809 | 2.65 | 57 | 330156 | 4.9 |
| Example 3 | DIBAL-H/30 | 15 | 384.5 | 109857 | 2.44 | 44 | 343543 | 5.6 |
| Example 4 | DOAL-H/10 | 50 | 491.2 | 42103 | 2.47 | 41 | 352151 | 5.4 |
| Comparative Example 1 | — | 50 | 441.3 | 37826 | 3.38 | 67 | 324945 | 5.5 |
| Comparative Example 2 | — | 15 | 185.2 | 52914 | 3.64 | 114 | — | — |

As seen from Table 2, it was confirmed that in Examples 1 to 4 using the catalyst composition of four of the present invention, a polymer having a lower xylene cold soluble content was obtained. That is, it was confirmed that a polymer having higher crystallinity was obtained. In addition, when Examples 3 and Comparative Example 2 were compared, equivalent or better activity was shown with the addition of DIBAL-H even with a polymerization time of 15 minutes.

TABLE 3

|  | unit | Example 1 | Example 2 | Example 4 | Comparative Example 1 |
|---|---|---|---|---|---|
| F/M | kgf/cm² | 17110 | 17517 | 17029 | 17041 |
| Tensile strength (yield) | kgf/cm² | 359 | 361 | 346 | 339 |
| Tensile strength (break) | kgf/cm² | 288 | 325 | 291 | 295 |
| Elongation | % | 23 | 13 | 19 | 16 |
| IZOD impact strength (room temperature) | Kgf cm/cm | 2.0 | 2.0 | 2.0 | 2.0 |
| IZOD impact strength (−20° C.) | Kgf cm/cm | 0.9 | 0.8 | 0.9 | 0.9 |

As seen from Table 3, though the tensile strength was increased in Examples 1 to 4, the impact strength at room temperature/low temperature and the elongation were not lowered. It is seen therefrom that the X/S causing deterioration of mechanical physical properties was decreased and a high crystallinity area to improve mechanical physical properties was increased to improve tensile strength. In addition, a crystal distribution and a Tie molecule uniformity between crystals were good, so that the impact strength at room temperature/low temperature and the elongation were shown as equivalent or better values.

TABLE 4

|  | DH1 (152° C.) J/g | DH2 (158° C.) J/g | DH3 (164° C.) J/g | DH4 (170° C.) J/g | DH5 (176° C.) J/g | DH5 % | DH4 + DH5 % |
|---|---|---|---|---|---|---|---|
| Example 1 | 4 | 6.8 | 17.1 | 62.2 | 33 | 26.8 | 77.3 |
| Example 2 | 2.9 | 7.1 | 17.5 | 48.8 | 44.4 | 36.8 | 77.2 |
| Example 3 | 3.1 | 7.4 | 15.4 | 46.7 | 49.2 | 40.4 | 78.7 |
| Comparative Example 1 | 4 | 21.4 | 8.2 | 61.9 | 22.4 | 19 | 71.5 |

As seen from Table 4, as a result of analyzing SSA-DSC, it was confirmed that in Examples 1 to 3 using the catalyst composition of four of the present invention, a ratio of DH4 and DH5 areas corresponding to a high crystallinity area was increased.

By using the catalyst composition of a specific combination according to the present invention, homopolypropylene having equivalent or better physical properties may be produced in a shorter time as compared with the case of using a conventional Ziegler-Natta catalyst.

In addition, homopolypropylene having excellent mechanical physical properties and high crystallinity may be produced.

Hereinabove, although the present invention has been described by specified matters and specific exemplary embodiments, they have been provided only for assisting in the entire understanding of the present invention. Therefore, the present invention is not by the specific matters limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A method of producing polypropylene, the method comprising polymerizing propylene in the presence of a catalyst composition comprising a Ziegler-Natta catalyst, an external electron donor, dialkylaluminum hydride, and trialkylaluminum, wherein the polypropylene has a xylene cold soluble content of 3 wt % or less, and
wherein the polypropylene has, when an endothermic peak is measured using successive self-nucleation and annealing (SSA)-differential scanning calorimeter (DSC), a sum of a peak value (DH4) observed at 170° C. and a peak value (DH5) observed at 176° C. of 75% or more of a total peak.

2. The method of producing polypropylene of claim 1, wherein a molar ratio of the trialkylaluminum/titanium in the Ziegler-Natta catalyst is 500 to 5000.

3. The method of producing polypropylene of claim 1, wherein the Ziegler-Natta catalyst comprises 10 to 30 wt % of magnesium (Mg) and 0.5 to 5 wt % of titanium (Ti).

4. The method of producing polypropylene of claim 3, wherein a molar ratio of the dialkylaluminum hydride/titanium in the Ziegler-Natta catalyst is 1 to 30.

5. The method of producing polypropylene of claim 1, wherein the dialkylaluminum hydride comprises diisobutylaluminum hydride (DIBAL-H).

6. The method of producing polypropylene of claim 1, wherein the method comprises:
a) adding the dialkylaluminum hydride and the trialkylaluminum and then adding the Ziegler-Natta catalyst and the external electron donor to a reactor to prepare the catalyst composition; and
b) adding propylene and hydrogen to the catalyst composition and performing polymerization.

7. The method of producing polypropylene of claim 6, wherein in step b), the polymerization is performed at 50 to 80° C. for 10 minutes to 120 minutes.

8. The method of producing polypropylene of claim 6, wherein in step b), the polymerization is performed under a pressure of 20 to 50 bar.

9. The method of producing polypropylene of claim 1, wherein the peak value (DH5) observed at 176° C. is 25% or more of the total peak.

10. The method of producing polypropylene of claim 1, wherein a content of the Ziegler-Natta catalyst is 0.0001 to 0.002 parts by weight with respect to 100 parts by weight of the propylene.

11. The method of producing polypropylene of claim 1, wherein a content of the dialkylaluminum hydride is 0.00001 to 0.01 parts by weight with respect to 100 parts by weight of propylene.

12. A method of producing polypropylene, the method comprising polymerizing propylene in the presence of a catalyst composition including a Ziegler-Natta catalyst, an external electron donor, dialkylaluminum hydride, and trialkylaluminum, wherein the polypropylene has a xylene cold soluble content of 3 wt % or less, and
wherein a content of the Ziegler-Natta catalyst is 0.0001 to 0.002 parts by weight with respect to 100 parts by weight of the propylene.

13. A method of producing polypropylene, the method comprising polymerizing propylene in the presence of a catalyst composition including a Ziegler-Natta catalyst, an external electron donor, dialkylaluminum hydride, and trialkylaluminum, wherein the polypropylene has a xylene cold soluble content of 3 wt % or less, and
wherein a content of the dialkylaluminum hydride is 0.00001 to 0.01 parts by weight with respect to 100 parts by weight of propylene.

* * * * *